March 8, 1960 W. W. PABST ET AL 2,927,659
DUST COLLECTOR
Filed March 2, 1955 4 Sheets-Sheet 1

INVENTORS
WALTER W. PABST
HERMAN F. BUSCHOW
BY *Moore & Hall*
ATTORNEYS

March 8, 1960  W. W. PABST ET AL  2,927,659
DUST COLLECTOR

Filed March 2, 1955  4 Sheets-Sheet 2

INVENTORS
WALTER W. PABST
HERMAN F. BUSCHOW
BY
ATTORNEYS

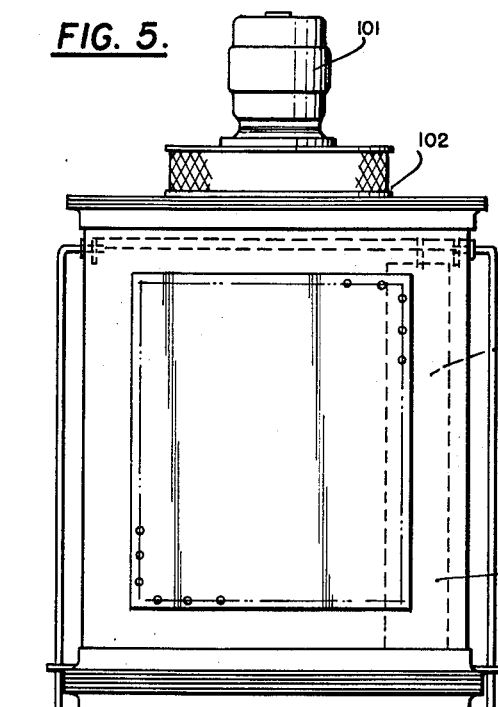
FIG. 5.
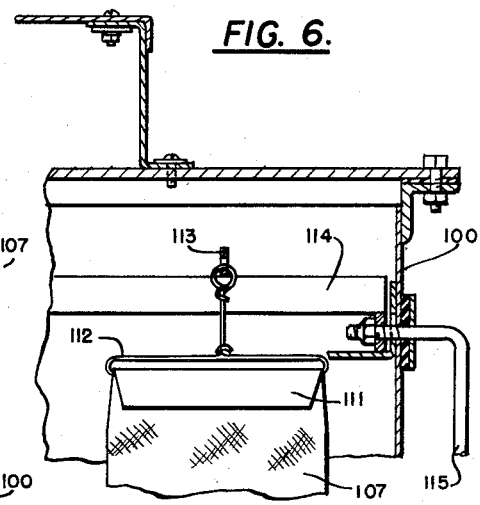
FIG. 6.
FIG. 7.
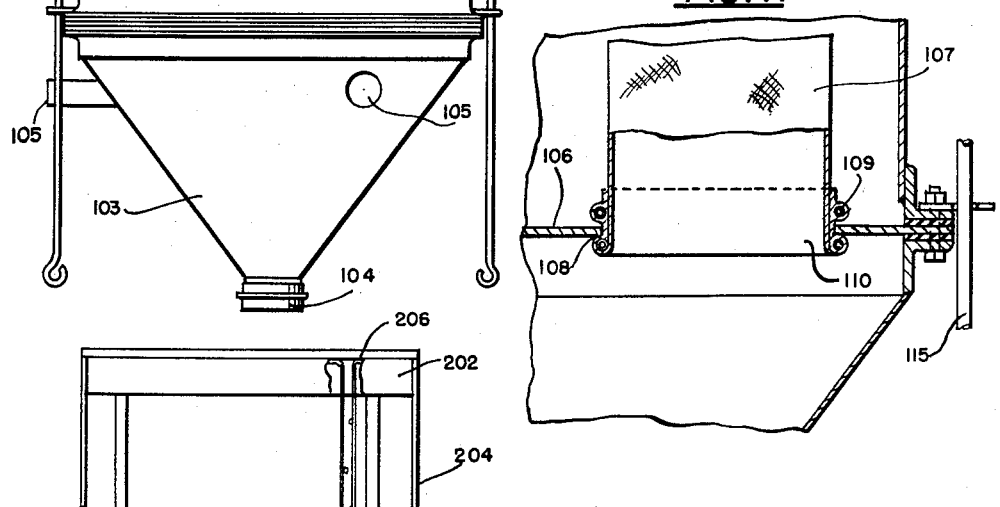
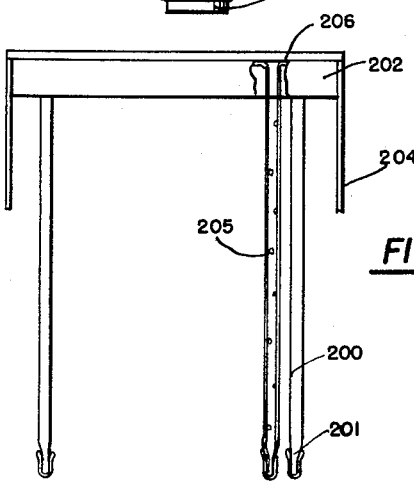
FIG. 11.
INVENTORS
WALTER W. PABST
HERMAN F. BUSCHOW
BY Moore & Hall
ATTORNEYS March 8, 1960 W. W. PABST ET AL 2,927,659
DUST COLLECTOR
Filed March 2, 1955 4 Sheets-Sheet 4

INVENTORS
WALTER W. PABST
HERMAN F. BUSCHOW
BY Moore & Hall
ATTORNEYS

United States Patent Office 2,927,659
Patented Mar. 8, 1960

2,927,659

DUST COLLECTOR

Walter W. Pabst, Elizabeth, and Herman F. Buschow, Hillsdale, N.J.

Application March 2, 1955, Serial No. 491,627

3 Claims. (Cl. 183—19)

The present invention concerns improvements in means for filtering air. The invention is particularly concerned with a device for filtering both large and small particles from the air in a machine shop or production room where materials such as metal, wood, plastic, or mineral are sawed, surfaced or otherwise treated, and has especial application to sawing, buffing, grinding machines and the like, including surface finishers of all kinds which produce dust particles.

It is an object of the invention to provide an inexpensive device which is easily constructed and in particular has low maintenance cost.

It is an object of the invention to provide a filter chamber wherein a filter means, such as spun-glass, comminuted material of various kinds, cellulose, and the like, or a series of filter bags in honeycomb mounting, may be employed. If desired, charcoal, chlorophyl or chemically reacting means may be added to remove gaseous impurities from the air. It is also within the purview of the invention to humidify the air at the same time, where the application of the invention makes this desirable.

One form of the invention comprises a cylindrical chamber which is resiliently mounted to minimize noise transmission, and in which is included a filter means. The upper part of the chamber is provided with a baffle, the center of which contains an aperture. Over the aperture is mounted an impeller driven by a motor mounted on top of the device. Radial output means of large area is provided around the periphery of the impeller so that even though the capacity of the machine, in cubic feet per minute, may be quite large, the actual speed of flow of air at the outlet of the machine is low. If desired, louvers may be provided in the top of the machine for those cases in which lateral projection of air is undesirable. While air intakes may be provided at the bottom, it is preferred that intake tubes be positioned in the top of the machine and channels provided conducting the air to the bottom where, on reversing its flow, it drops the heavier entrained particles which may be easily removed. The lighter particles, carried by the air on its upward flow, are then caught and removed by the filtering means per se.

It is an added object of the invention to provide a differential pressure means for determining when the filter efficiency has decreased to a predetermined level or has become substantially inoperative. This device comprises a diaphragm and a microswitch in the cicruit of a signal lamp. The circuit may also control the motor circuit if desired. The diaphragm is subjected, on opposite sides, to pressures above and below the filter; and when the pressure differential reaches a selected value, such as 3 to 4 inches of water, the microswitch is operated to close the signal lamp indicating that the filter needs changing. A companion circuit may be employed to cut off the motor. However, in the normal case, the filter usually will have several hours of useful life after the signal lamp is lighted; and in those applications in which a motor control circuit is employed, it is desirable that a delay of at least an hour be introduced, either by means of a separate microswitch and diaphragm or a two-step microswitch.

Reference is made to the drawing in which like numerals refer to like parts throughout. The figures here presented are intended for illustrative purposes only and are not to be taken as limiting.

Figure 5 is an elevation of another form of the invention employing filter bags in a honeycomb mounting.

Figure 6 is a fragmentary schematic elevation of one form of mounting for the bags, including a shaking means.

Figure 7 is a fragmentary schematic sectional view of a mounting means for filter bags in honeycomb relation.

Figure 11 is an elevation in section of one form of mounting for filter bags, showing one form of filter bag in place.

Figure 1:
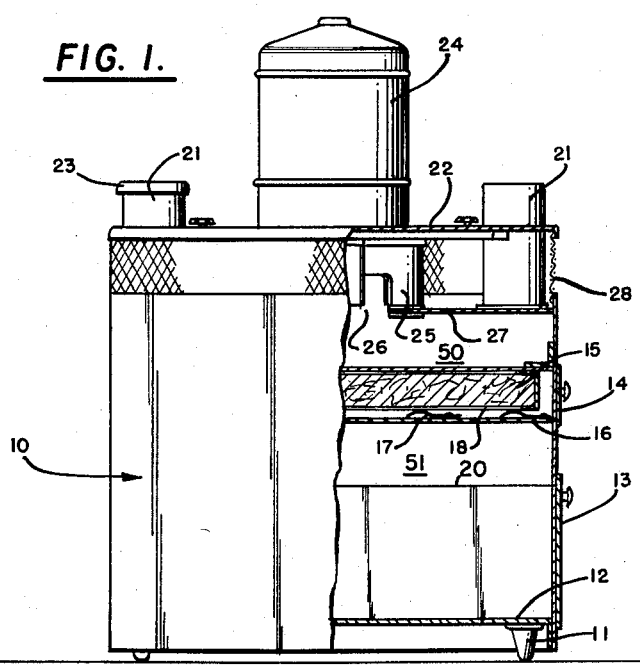
Figure 1 is a front elevation, partly in section, of one form of the invention.

In the drawings, a rectangular sheet metal housing 10 is provided with resilient rubber mounting members 11 fastened to the bottom 12. The bottom of the side wall of housing 10 is provided with a clean-out door 13 and a second door 14 for the insertion and removal of a filter element 15. Filter element 15 may be formed of spun glass, cellulose, or similar material, such as are readily obtainable on the market. The filter member 15 is carried by a support 16 having spring elements 17 which press against an upper frame member 18 to minimize vibration and noise.

Figure 2:
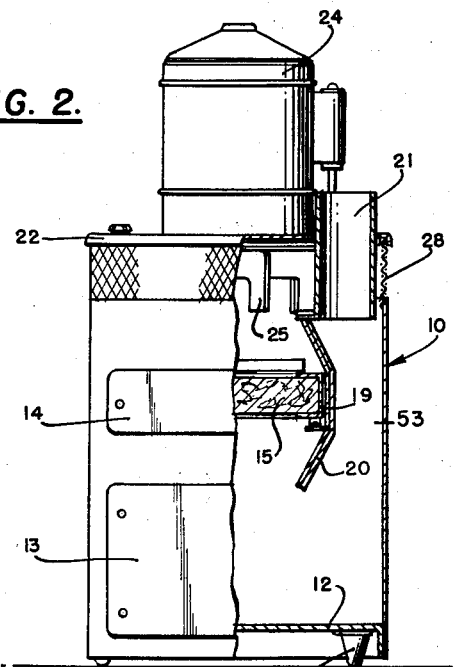
Figure 2 is a side elevation, partly in section, of the form shown in Figure 1.

As shown in Figure 2, the filter means 15 does not extend entirely across the housing 10 in all directions, but has one end mounted in a channel 19 carried by a baffle element 20. Baffle element 20 is carried by housing 10 and provides a channel 53 between it and the outer wall of housing 10 for intake air which is introduced into the machine through ducts 21, mounted in top 22 of housing 10. The space to the left of baffle 20 in Fig. 2 is thus, in effect, separated by filter member 15 into upper and lower compartments 50 and 51 which are above and below the filter respectively. Ducts 21 may be provided with a cap 23, so that only one is utilized, if desired. The twin air intakes or ducts 21 are preferably about three inches in diameter, and extend well above the top 22 of the device so as to provide ample room for a flexible or rigid duct connection leading from a grinder element, surface finisher, or the like.

It will thus be seen that while it is desirable that the filter device as a whole be located close to the machine or area it serves, there is considerable leeway in its location, which is controlled principally by the friction of the intake air which will increase as a function of the length of flexible hose connection. Top 22 carries as an integral unit a motor casing 24 from which depends an impeller 25 having radial vanes centered over an aperture 26 in a top baffle member 27 within the housing 10. In the form of the invention shown in Figure 1, the peripheral area of the outer wall of housing 10, in the air outlet compartment 52 between the top 22 and the top baffle 27, may be provided with a grill or similar exhaust means 28. It will be seen that this exhaust area is quite large compared with the intakes to the machine, and it follows that the exhaust velocity of purified air is low, air blasts are avoided, and the filtering efficiency is increased.

If desired, a simpler and cheaper mounting of the motor 24 and its impeller 25, such as that shown in Figure 5, may be utilized. This construction sacrifices some of the large exhaust area for a saving of material. Mounted on top of the surface 22 in full view of the operator and inspectors, is a pilot or filter change warning light 29 which is lighted when the filter dirt load reaches a predetermined limit. Light 29 is provided with an electrical circuit 30 containing a transformer 31, the primary of which is connected to a standard power supply. The circuit 30 contains a normally open microswitch 32. By normally open, it is here meant that the switch breaks the circuit 30 when the device is in normal satisfactory operation, and closes the circuit 30, thus placing the light 29 across the secondary of transformer 31, when the pressure differential is such as to indicate that the filter 15 is beginning to lose or has lost its efficiency.

In the form of the device illustrated for control purposes, microswitch 32 is enclosed within a chamber 33 which is substantially air-tight and has mounted therein a diaphragm 34 supported by mounting means 35. Diaphragm 34 divides the chamber 33 into two separate compartments, one of which is connected by a pipe or tubing 36 to the space 37 on the exhaust side of the filter 15. The opposite side of chamber 33 is connected by a tubing 38 to the space in housing 10 on the intake side 40 of filter 15. It will be seen that as the filter 15 becomes more and more loaded with dirt particles or the like which it has removed from the filtered air, its resistance to air flow increases and the pressure differential between its sides will accordingly increase. For normal operation of the machine, the pressure differential for a clean filter is about two inches of water. As the dirt load on the filter 15 builds up, this pressure differential gradually increases and the pressure in the chamber 40 approaches atmospheric. This rise of pressure in chamber 40 forces the diaphragm 34 away from microswitch 32 causing it to close the circuit 30 and light lamp 29 as a signal for the attendant to change the filter 15 which is readily done by opening the door 14 and sliding a new filter in. If desired, of course, the filter 15 may be cleanable by dipping it in a suitable solution or it may be disposable.

Figure 9:
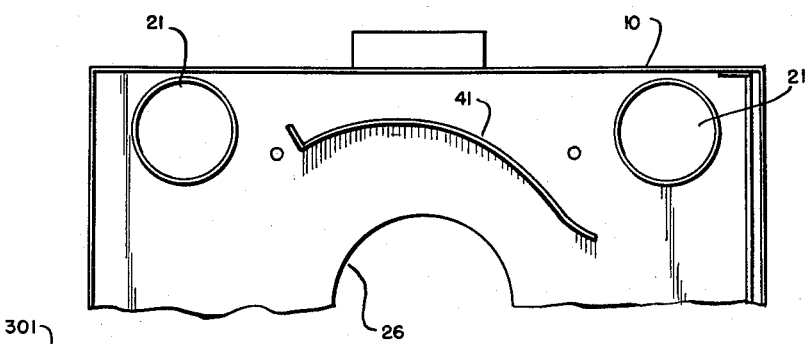
Figure 9 is a plan view of a baffle means which may be employed in conjunction with the impeller if desired.

It will be understood by those skilled in the art that the construction of the control switch 32, diaphragm 34, chamber 33 and the connection conduits 36 and 38, is a matter of choice; and whether this microswitch 32 is normally open or normally closed is solely a design consideration. As stated above, the microswitch 32 may be a dual circuit switch provided with a second circuit similar to that of 30 which controls a relay in the circuit of motor 24. Such a relay would be normally closed, but when the movement of diaphragm 34 is sufficiently great, because of the added increase of pressure differential between the two sides of filter 15, it will operate the second circuit of microswitch 32, energize the relay and open the motor circuit. As stated above, such action would normally be delayed for one or several hours after the pilot switch goes on, so as not to shut down production. However, one way to assure a change in filter and prevent an operator or attendant from ignoring the pilot light, would be to provide an automatic motor cut-off.

Where it is desired to control the flow of air at the exhaust 28, the impeller 25 may be provided with a baffle means 41, as shown in Figure 9, if desired. Baffle 41 is preferably mounted on the upper side of top baffle 27 between the inlets 21, spaced from, and only partially surrounding the impeller 25. The baffle 41 can be positioned to prevent exhaust air from blowing full force at the normal station of an operator. Baffle 41 prevents the air from being exhausted around a portion of the periphery of means 28 and it has been found to a degree to increase the air-pulling power of the device. This effect is probably due, at least in part, to the similarity between the configuration of the baffle 41 and the normal impeller pump enclosure.

Referring now to Figure 5, we see a larger form of the device which utilizes filter bags rather than a filter pad 15. Figure 5 is provided with a cylindrical housing 100 having a motor 101 mounted on top thereof and provided with much the same perforated annular exhaust member 102 discussed in connection with Figures 1 and 2. Housing 100 is provided with a conical bottom 103, with a clean-out door 104 at the apex thereof. In the form shown in Figure 5, the intake 105 is at the juncture of the conical surface 103 and cylindrical surface 100. In this form of the device the heavy particles are dropped into cone member 103, as the air makes a right-angle bend, and turns upward under the action of motor 101 and its impeller member, toward a perforated mounting member 106 containing a large number of filter bags 107. Perforated mounting member 106 is positioned within cylindrical housing or chamber 100 just above the intakes 105, and is provided with a plurality of apertures 108 the edges of which mount the necks of the bags 107. The bags 107 are provided at their open ends 110 with two closely spaced wound steel expansion spring members 109. The opening 110 into the bag 107 is elongate and relatively narrow. The springs 109 are sewed into the cloth comprising the bag, and while resilient, are firmly held. Springs 109 fit snugly against the edges of the apertures 108 in mounting partition or supporting panel 106 and form a good seal as well as firm mounting for the mouth of the bags 107. Springs 109 provide rapid and easy installation of the bags in aperture 108. The upper closed ends of bags 107 are provided with a fold 111 through which is threaded a support wire 112 which passes around a shaker bar 113 carried by channel member 114 mounted on the side of cylindrical housing 100. A lever 115 is connected to shaker bar 113 to transmit a vibratory shaking and cleaning action thereto.

As shown in Figure 11, filter bags 200 are mounted with their elongate narrow mouths held in side-by-side relation by a slotted frame or mounting rack 202. Rack 202 has a group of closely spaced narrow elongate open flanged slots 203 rounded to receive the flared necks 201 of the bags 200. The flared necks 201 are glued or cemented to open flanged slots 203 to form a dust-proof mounting seal. Arms 204 serve to mount rack 202 inside the body of the filter.

Bags 200 are provided with a spreader wire 205 to prevent collapse of the bag on the application of reduced pressure to the mouths of bags 200, so that the entire outer surface of the bags is available to filter dust particles. Wire 205 is preferably of stainless steel or similar rust resisting material. If desired stainless steel wool may be inserted in the bag instead of spring 205 to keep the bags 200 distended for effective filtering action. The closed ends of bags 200 are clamped by a cadmium plated metal channel member 206. The depending bags 200 are shaken or vibrated by a vibrator 207 mounted on rack 202 or a shaker bar similar to 113.

Figure 3:
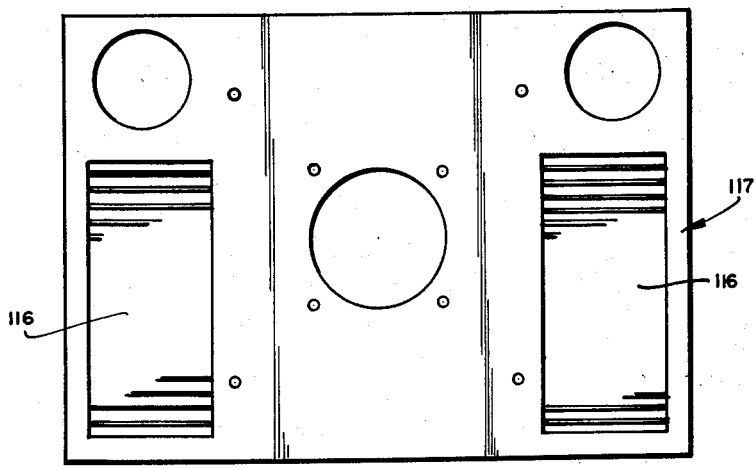
Figure 3 is a modified form of the top of the filter showing louvers by which the purified air is exhausted.
Figure 4:
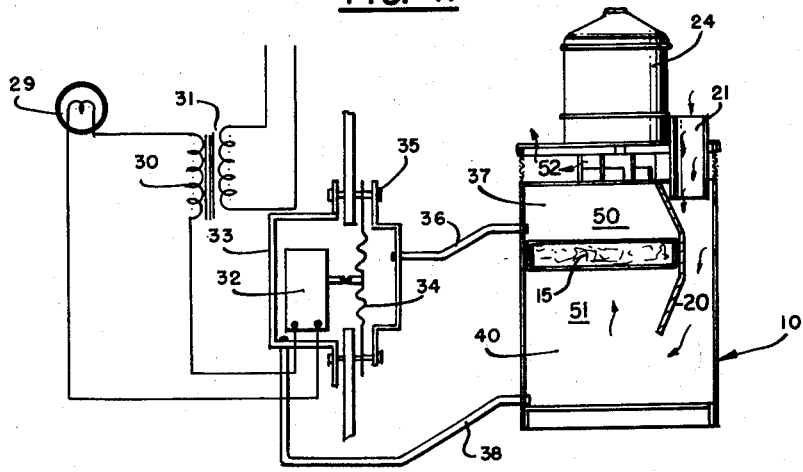
Figure 4 is a schematic diagram of the indication and control apparatus and circuit.
Figure 8:
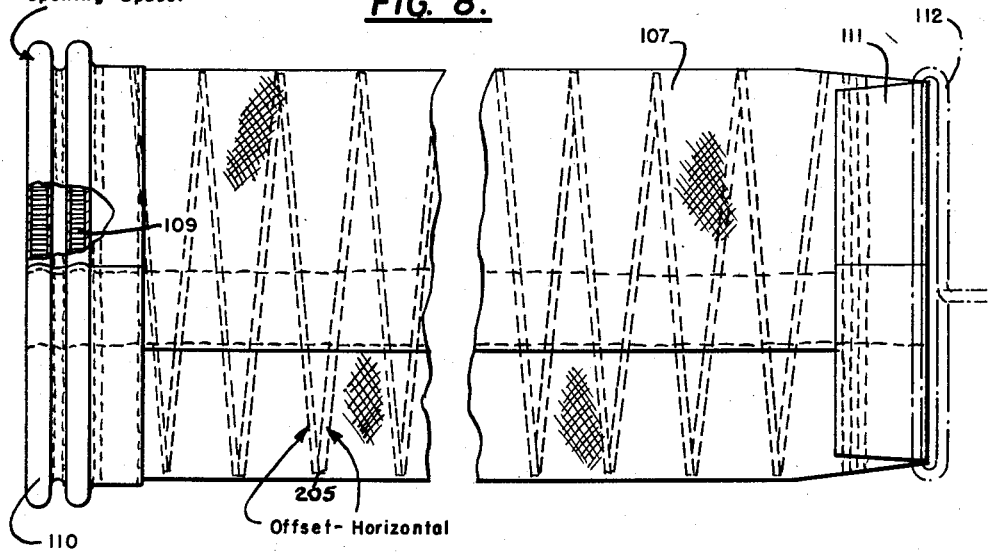
Figure 8 is a plan view of one form of filter bag according to the invention.

As stated above, the annular exhaust means 28 may be supplanted where desired, by louvers 116 in the top of the device. The same is, of course, true of the exhaust means 102. These louvers, as shown in Figure 3, are preferably on two sides of the top and direct the air straight up rather than sidewise to prevent interference with the operator. They have sufficient area not to build up substantial back pressure within the device. The bottom 12 and the door 13 of the device, as shown in Figure 1, may be constructed so that both open readily for the purpose of relieving pressure within the device in the event of explosion. It will be noted that filters 15 or bags 107 or 200 may be used in the filters of both Figures 1 and 5. The choice is usually one of application. For example, where abrasives are used such as diamond dust, recovery from the bag filters is easier.

Figure 10:
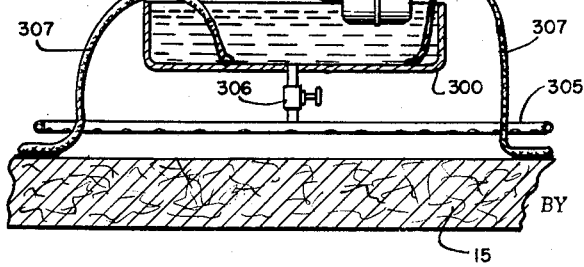
Figure 10 is a schematic fragmentary view in section of one form of water level control for a humidifying device.

In Figure 10 is shown one method of controlled humidification of the filtered air. A pan 300 is mounted in the upper inside part of the filter above the filter pad 15. Pan 300 is filled to a suitable level with water or a solution or mixture which may contain glycerine to control the rate of evaporation and also prevent freezing. A water supply 301 is provided with a float controlled valve 302 operated by float 303 attached by arm 304 to valve 302. As shown in Figure 10, the float 303 is raised to shut the valve 302, but as the fluid level drops valve 302 opens and supplies additional water or the like. A spray ring 305 may be supplied under pan 300 and connected thereto by a valve 306 for control of fluid flow from the ring onto pad 15. Wicks 307 may be used with ring 305 or instead of it as desired. Pan 300 is deep enough to provide sufficient head of water to give a desired flow through ring 305. Arm 304 may be adjustable to alter the shut-off point of float 303 and so control the maximum water level in pan 300 and thereby the available head of pressure.

While there has been described above a particular embodiment of the invention, now believed to be preferred, many variations will readily suggest themselves to those skilled in the art. All of these different forms which fall within the spirit of the invention are intended to be covered by the appended claims wherein generic terms are employed for the express purpose of including the many equivalent structures by which the present results may be obtained.

The claims comprise:

1. In combination in an air filter, a housing having top and side walls, air intake means for said housing mounted in said top wall, said housing having upper and lower compartments separated by a filter means for providing an airflow channel between said compartments, a top wall for said upper compartment, baffle means extending below said intake means and defining with a portion of said housing a flow passage communicating with said air intake means, said baffle means further extending past said filter means and into said lower compartment, an air outlet compartment adjoining said upper compartment and formed in part by the top wall of said upper compartment and communicating therewith through an aperture in the top wall of said upper compartment, a driven radial air impeller mounted in said air outlet compartment closely aligned with and adjacent to said aperture and with its axis of rotation normal to said top wall so as to exhaust air from said upper compartment, said air outlet compartment having a large portion of its wall surface perforated, said portion having an area that is larger than said air intake means to cause the exhaust air to flow at a slower speed, whereby the air is compelled to make a substantially 180° turn before passing through said filter whereby heavy entrained particles are dropped.

2. The combination according to claim 1 having in addition filter load signal means mounted in said housing and comprising a pressure differential element having connections made respectively to said upper and lower compartments and being effective upon an increase in the pressure differential between said lower and upper compartments above a predetermined value to give a distinctive indication as to filter condition.

3. The combination according to claim 1 further including controlled humidifying means situated in said upper compartment of said housing comprising, a source of water, and means for supplying water from said source to said filter means at a predetermined rate.

References Cited in the file of this patent
UNITED STATES PATENTS

| Number | Name | Date |
|---|---|---|
| 1,109,639 | Sutton | Sept. 1, 1914 |
| 1,316,442 | Goughnour | Sept. 16, 1919 |
| 2,025,946 | Wenner-Gren | Dec. 31, 1935 |
| 2,034,373 | Bilde | Mar. 17, 1936 |
| 2,296,359 | Martinet | Sept. 22, 1942 |
| 2,320,368 | Leathers | June 1, 1943 |
| 2,368,343 | Buskirk | Jan. 30, 1945 |
| 2,392,601 | Long | Jan. 8, 1946 |
| 2,394,923 | Little | Feb. 12, 1946 |
| 2,453,951 | Vedder | Nov. 16, 1948 |
| 2,725,114 | Brace | Nov. 29, 1955 |

FOREIGN PATENTS

| Number | Country | Date |
|---|---|---|
| 345,440 | Great Britain | Mar. 26, 1931 |
| 668,383 | Great Britain | Mar. 19, 1952 |
| 787,871 | France | July 16, 1935 |